US012014418B1

(12) United States Patent
Melkomian

(10) Patent No.: US 12,014,418 B1
(45) Date of Patent: Jun. 18, 2024

(54) SECURE, COMPLIANT ELECTRONIC TRADING PLATFORM FOR COMMODITIES, FUTURES, OPTIONS, FORWARDS, DERIVATIVES, SWAPS, AND SECURITIES EXCHANGE USING THE OPEN OUTCRY METHODOLOGY

(71) Applicant: Raymond Michael Melkomian, New York, NY (US)

(72) Inventor: Raymond Michael Melkomian, New York, NY (US)

( * ) Notice: Subject to any disclaimer, the term of this patent is extended or adjusted under 35 U.S.C. 154(b) by 103 days.

(21) Appl. No.: 15/441,036

(22) Filed: Feb. 23, 2017

Related U.S. Application Data

(60) Provisional application No. 62/302,082, filed on Mar. 1, 2016.

(51) Int. Cl.
| | | |
|---|---|---|
| *G06Q 40/04* | (2012.01) | |
| *G06F 16/22* | (2019.01) | |
| *G06Q 30/08* | (2012.01) | |
| *G10L 15/26* | (2006.01) | |

(52) U.S. Cl.
CPC ............. *G06Q 40/04* (2013.01); *G06F 16/22* (2019.01); *G06Q 30/08* (2013.01); *G10L 15/26* (2013.01)

(58) Field of Classification Search
CPC ................................ G06Q 40/04; G06Q 40/06
See application file for complete search history.

(56) References Cited

U.S. PATENT DOCUMENTS

| | | | | |
|---|---|---|---|---|
| 5,758,097 | A * | 5/1998 | Debe ...................... | G06Q 40/00 705/12 |
| 2002/0128952 | A1 * | 9/2002 | Melkomian ............ | G06Q 40/04 705/37 |
| 2002/0133449 | A1 * | 9/2002 | Segal ..................... | G06Q 40/04 705/37 |
| 2003/0126068 | A1 * | 7/2003 | Hauk ..................... | G06Q 30/08 705/37 |
| 2007/0295803 | A1 * | 12/2007 | Levine ................... | G06Q 20/04 235/379 |

* cited by examiner

*Primary Examiner* — Jessica Lemieux
(74) *Attorney, Agent, or Firm* — Knowmad Law

(57) ABSTRACT

A secure, compliant trading platform for securities exchange using the open outcry methodology within a secure electronic exchange environment that reduces or eliminates unfairness and opportunities for fraud within the marketplace. The system assures that private information is retained private until a bid or offer is placed. Trades are not recorded or reported until actually executed and all information is made available to all parties at the same time. The system archives all exchange member information in time sequence for compliance, auditing, and forensic purposes. The system uses a personal display device for each exchange member and high speed networking to allow exchange members to communicate with customers and other exchange members while in a physical exchange facility that may be virtually connected to other physical exchange facilities through a high speed secure network.

11 Claims, 6 Drawing Sheets

SECURE, COMPLIANT ELECTRONIC TRADING PLATFORM FOR COMMODITIES, FUTURES, OPTIONS, FORWARDS, DERIVATIVES, SWAPS, AND SECURITIES EXCHANGE USING THE OPEN OUTCRY METHODOLOGY

PRIORITY CLAIM

This non-provisional application claims priority to Provisional Patent Application Ser. No. 62/302,082, entitled "A Secure, Compliant Electronic Trading Platform for Commodities, Futures, Options, Forwards, Derivatives, Swaps, and Securities Exchange Using the Open Outcry Methodology", filed on Mar. 1, 2016.

TECHNICAL FIELD

The present invention relates generally to the exchange structure, front and back office/firm/exchange operations, and the functions of brokers and their customers. The exchange also facilitates the trading of commodities such as futures, options on futures, forwards, swaps, and derivative markets. The exchange also facilitates the trading of securities such as stocks, bonds, options, warrants, foreign exchange (FX), and any other security instruments. Furthermore, the exchange facilitates the trading of over-the-counter markets in all instruments such as securities, derivatives, and commodities.

BACKGROUND OF THE INVENTION

Trading on the securities exchanges has an inherent problem related to latency arbitrage and resulting unfairness and fraud that benefits high frequency traders (HFT) that is facilitated by electronic trading platforms and order matching methodology. The present invention re-instantiates the open outcry methodology into electronic trading platforms as a solution to security, compliance, and auditing problems that eliminate unfairness and opportunities for fraud. The invention uses the electronic trading platform to support human interaction at human speed, rather than replacing humans with algorithms that introduces unfairness and fraud that compromises the integrity of the marketplace.

Roles and Participants

There are four key participants of concern to this invention. All market participants have assets and funds in accounts held by clearing firms. Traders are participants who trade with their own account. The assets and funds that traders are negotiating or exacting a trade with are owned by themselves. Brokers represent customer orders and the executed transactions are directed into customer accounts. Brokers often have many customers whom they represent. Customers place orders with brokers who act on their behalf. Customers may have multiple accounts with clearing firms. Market Makers in the securities and commodity markets function differently. A market maker in the securities markets takes on risk of holding a certain amount of securities in order to facilitate trading in that security. They create a supply of shares from which buyers and sellers can trade against. These securities market makers may attract customers to the market place by presenting bid and offer quotes for a guaranteed/firm/soft number of shares, bonds, or securities. These market makers sell from their own inventory and seek to find an offsetting order to balance inventory. Market makers are a critical part of the exchange because they provide liquidity in the marketplace in the securities markets. In the commodities markets, market makers are not affirmatively or expressly obligated to take the other side of any trade or to provide any inventory of any sort. Instead, a market maker places a bid and offer and trades at least one contract. In the commodity markets liquidity comes from the all market participants that include the traders, brokers representing the customer and market makers.

In this disclosure, the term Exchange Member will be used to describe a trader, broker, or market maker when they are in their role as an active trader in the system—specifically when they are trading. Where the differences in these roles is critical to a function of a system component, the disclosure will specifically state the role to which it refers.

Open Outcry Methodology

Prior to the advent of electronic trading, or more specifically, electronic order matching, trading was accomplished through the open outcry method (or pit trading) on a physical exchange floor in a pit or trading ring specific to a certain commodity or security where buyers and sellers negotiated trades. Within the open outcry methodology, brokers receive orders from their respective customers. This is the broker's order sheet. Those orders are retained in privacy between the broker and the customer. That privacy is critical because only the broker knows what his customers intend to do at any given moment which is a key aspect of his strategy to maximize profit for his customers and to fill his customers' orders at the best possible price. The privacy is also important because it maintains the anonymity of the customer. This is a fiduciary obligation between brokers and customers that must be honored to maintain the integrity of the marketplace.

In order to better advise customers on the market conditions, a broker may determine the position of a market in order to maximize profits for his customers. The broker may access all available market data that is in part a result of confirmed trades that are reported by the exchange and the clearing house to the market place. The broker also listens to bids and offers as they are shouted or announced by exchange members on the trading floor in the trading pits. Additionally, there is market news and reports and vendor data that is available to all exchange members. All the market information is available to market participants in the form of fundamental and technical analysis.

The exchange member is required to use due diligence in finding the current market and once he has established a market he can improve both the bid and ask, or the bid only, or the ask only. In other words, the exchange member may solicit a bid/offer, may make a bid/offer himself, or may bid/offer on an existing offer/bid. As trades are confirmed, the exchange platform will mark the trade on the member's execution or trade sheet and will report the trade to the exchange big board for all exchange members to see the trade, and report the trade to the clearing house. The result of the trade becomes available to all once it is acknowledged by both counterparties at the time of trade. All trades include (a) what was traded (commodity, contract month, and year), (b) terms of the trade (size and price), (c) participants (the traders or counterparties), and (d) the time and date of the trade (time stamp)—the sequence can appear in any order.

There are many types of orders and contingencies that must be considered. Among these include: market order, limit order, stop order (stop loss), stop limit order, one-cancels-the-other order (OCO), one-sends-the-other order (OSO), bracket order, market if touched (MIT), good till cancel (GTC), fill or kill (FOK), market on close (MOC), market on open (MOO), immediate or cancel order (IOC), cancel replace order (CRO), and discretionary order. The present invention facilitates all of these.

The open outcry methodology occurs at human speeds—the speed of a shout, announcement, and/or verbal response. As discussed in the next section, motivated by a desire to increase the speed of trading and thus the magnitude, order matching was created that penalized human speed trading by violating the level trading field, allowing HFTs to view orders before they are executed (called flash trading). The present invention also seeks to increase the speed and magnitude of trading but without sacrificing the human speed, fairness of trading and anonymity of market participants nor the necessary privacy of the customer-broker relationship on which the integrity of the exchange rests.

Electronic Trading and Order Matching

Latency arbitrage and HFTs are artifacts of electronic trading platforms that use an order-matching methodology. Order matching is algorithmic and occurs at machine speeds (computer processing speed) that are much faster than human speeds. Depending on the type of order placed (e.g. market order, limit order, multiple contract order) and whether or not there are contingencies (e.g. good till cancel, fill or kill, immediate) orders are "matched" to offers by price and quantity. When there is a match, the trade is completed. There is no negotiation between traders thus no need for brokers or human traders. Machines do the trading.

Electronic trading platforms were created to address several specific problems that were thought to improve the performance of the marketplace in general. First among these is the cost and speed by which trades can occur. Open outcry is inherently slower than order matching because it includes human-to-human communication, interaction, and negotiation. Therefore, by removing the people, electronic trading platforms reduced costs by eliminating physical floor operations and paved the way for the HFTs. Electronic trading was also advertised as a means to increase liquidity by expanding the marketplace (more buyers and sellers) since the physical limitations of a trading floor were removed. This was also meant to increase competition and transparency, whereby each participant could know the exact price of any security at any moment in time. The public was sold the idea that electronic trades could eliminate the so called delays inherent to traditional open outcry methods because every trade, once completed by individuals (human traders), is literally thrown into the pit and eventually manually logged into the system by the exchange and then confirmed by the transacting exchange members' clerks. The present invention addresses this issue as well by streamlining and automating the trade confirmation and reporting process.

To facilitate the algorithms that support HFTs, an important but fundamental procedural change was allowed. Exchanges allowed HFTs to view the incoming orders of the market participants. The algorithm receives access to order information from other market participants to automatically match bids and offers and/or to place predatory bid/offers to push the price up or down depending on desired strategy. While human traders hold that information private for the purposes of negotiating the best position for their customers, the algorithm already knows what orders exist and therefore HFTs can trade with that advantage, which is entirely unfair.

The reception of market data at different times for different people is called latency arbitrage which introduces a number of compliance issues. The most critical of these is front running. Because the HFT can see the market participant orders before they are executed, they can trade ahead knowing that they are "back stopped" by the orders in the queue. If an HFT algorithm knows that there is a big market order in the queue, the HFT can buy ahead of that order, wait until the market moves a few cents higher, and then sell into that market order's position. There are other variations on this theme, but all are made possible when one exchange member (the HFT in this case) is allowed to see market orders before they are executed. This is an inherently unfair practice that the current invention directly addresses.

Requirements for a Secure, Compliant Trading Platform

It is unreasonable to expect commodity and securities exchanges to return to purely open outcry methods any time soon. The idea was advertised and sold to the public/marketplace that order matching methodology would be a better way of transacting simply because it would be faster, cheaper, more liquid and efficient way of trading without a middle-man—the broker. Unbeknownst to the market participants, exchanges, along with certain elite Wall Street executives, set the rules tilting the market advantages in favor of the elite—the HFTs. These elite Wall Street and exchange executives portrayed that the market demands faster trading and in higher volumes (which was untrue). However, a market without integrity is unsustainable. Therefore, the present invention discloses a system and method for employing the open outcry methodology within an electronic trading environment (that excludes HFTs) that ensures the security and compliance of each and every transaction, and thus ensures the integrity of the market itself. The system must allow customers to transmit their orders reliably, easily, and quickly to their broker. The system must retain privacy between customer and broker such that the broker can always meet his fiduciary obligations to each customer. The system must provide exchange members with all available information on which to execute a trading strategy. The system must also expand the market beyond the physical constraints of a trading pit, but without sacrificing the role of human traders. Lastly, the system must facilitate complete auditability for compliance. All trades and information that influences a market must be tracked and archived. All conversations and actions are also tracked and archived.

In summary, the requirements for the present invention include:
  Open outcry methodology: trading through negotiation and two-way voice at human speed
  Physical trading floors: but extensible to a worldwide marketplace
  Preservation of anonymity of customers
  Preservation of secrecy of orders even after execution
  Automated audit trail
  Market transparency: simple awareness of market position at any given time
  Market integrity: remove sources of unfairness and fraud
  Narrow bid/ask range: improves the efficiency of trading
  Efficient marketplace: highest transaction rate without sacrificing the human element
  Market liquidity through all market participants

SUMMARY OF THE INVENTION

The present invention addresses security and compliance issues inherent to electronic trading platforms. Specifically, the invention re-instantiates the open outcry methodology within an electronic trading platform that (a) ensures the security of private information integral to the customer-broker relationship, (b) facilitates compliance by tracking all market activity and cataloguing data for auditing, event recreation, and forensics, and (c) supports exchange members with accurate, timely information so that they can execute trades in the most efficient manner.

In this disclosure, "secure" refers to both physical and cyber security. Physical security pertains to physical assets (hardware) and the exchange facilities themselves. Cyber security pertains to software and network security. "Compliant" refers to compliance with the rules and regulations of both government authorities and agencies and private sector self-regulation of electronic trading platform users or market participants through the automated and manual audit trail of the trading platform or environment.

The system utilizes a personal display (which can be an eye-worn display, or other visual display that is worn by the exchange member or is otherwise personal, meaning that only the exchange member may view it) and a secure network to transmit orders into the system from customers and to allow fast communications between exchange members. A customer's order is digitized and converted into text (if necessary) and formatted into one of the allowable and recognized types of order with or without contingencies. That order is private to the broker. There is no opportunity for front running to occur because the trade will not be confirmed with the customer until it is executed and recorded with the exchange, at which time the result will be known openly.

Exchange members execute their trades from a physical trading pit but trading pits can be virtually connected thus making the market of unlimited size and can include trading pits in any part of the world. The system ensures the integrity of the exchange member's identity and the facility itself. Exchange members use the open outcry method within their respective physical trading pit by shouting or announcing bids and offers. However, a trade can occur between an exchange member in one physical pit and an exchange member in another remote trading pit. All necessary information about the trade is logged and time stamped for auditability and compliance.

The invention is superior to existing exchange systems and methods in that it maintains the human to human negotiation aspects of the open outcry method with appropriate safeguards to ensure the compliance of each and every trade. Because the architecture is entirely digital, all compliance data can be stored to ensure that fairness is maintained and fraud is disallowed. All market participants receive data at the same time and in the same manner which ensures the integrity of the market.

DESCRIPTION OF THE INVENTION

There are several aspects to the present invention that will be described sequentially. First, there is a physical security component whereby the system assures that exchange members are who they purport to be before they can enter a pit and begin trading. Second, a customer interface component of the system addresses the ways in which customers submit their orders to brokers to be executed. Customers do not trade but must clearly state their intentions so that their broker can execute in the most efficient manner on their behalf. Lastly is the exchange member interface component of the system that addresses how trading is accomplished. This includes how information is processed and presented to exchange members and also how exchange members negotiate and execute their trades, as well as how the system assures compliance, security, and auditability.

Physical Security

Physical exchange facilities can be anywhere in the world, but only if they meet security standards and are approved by the exchange. A physical exchange facility must have reliable high speed networking with redundancy. The building must have secure access that verifies that anyone entering the building is who they purport to be. Exchange members must wear their trading jacket and badge as they would on a traditional trading floor. Each exchange member must use a personal exchange member interface (see section below) to allow them access to the system. The facility will ensure that there are back-up interfaces for exchange members in case of malfunction.

Each facility will maintain a proximity limitation that only allows the exchange member interface to full trading function when the exchange member is within the trading floor. A non-trading function is available when the exchange member is within the secure building itself but not on the trading floor. A public information-only interface is allowed outside the secured area. Communication with customers is also allowed outside the building but is not linked to the system until the exchange member re-enters the exchange floor. All communications made within the system are recorded by the system.

Lastly, as the exchange member wishes to enter the exchange floor, he must log into the system. The login uses a multi-factor method that may include passwords, biometrics, voice identification, or any other identification factor. At this point, the exchange member is "on the exchange floor" and may begin trading.

The Customer Interface

Figure 1:
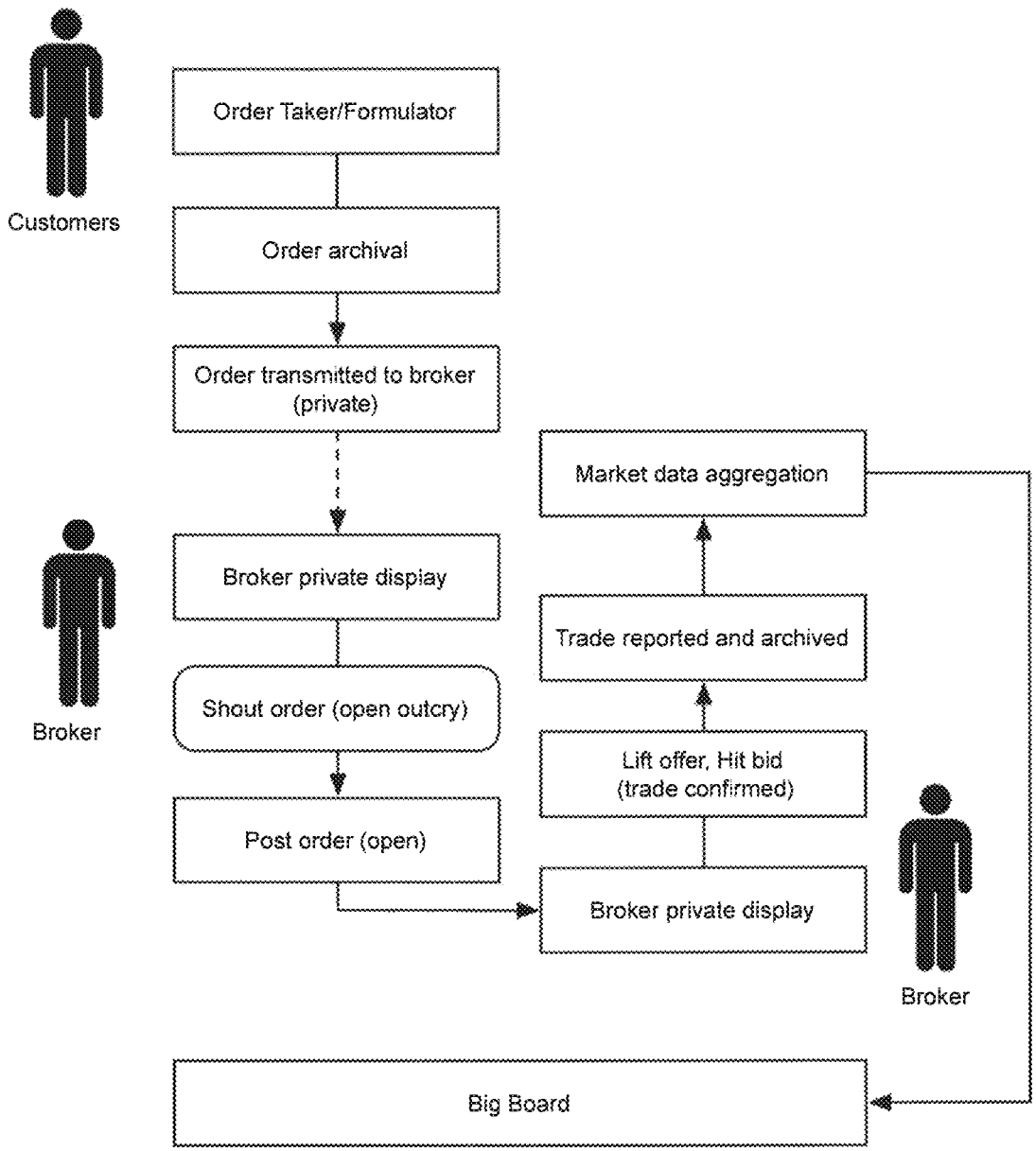
FIG. 1 is a process flow diagram of the method that identifies key components of the system.
Figure 2:
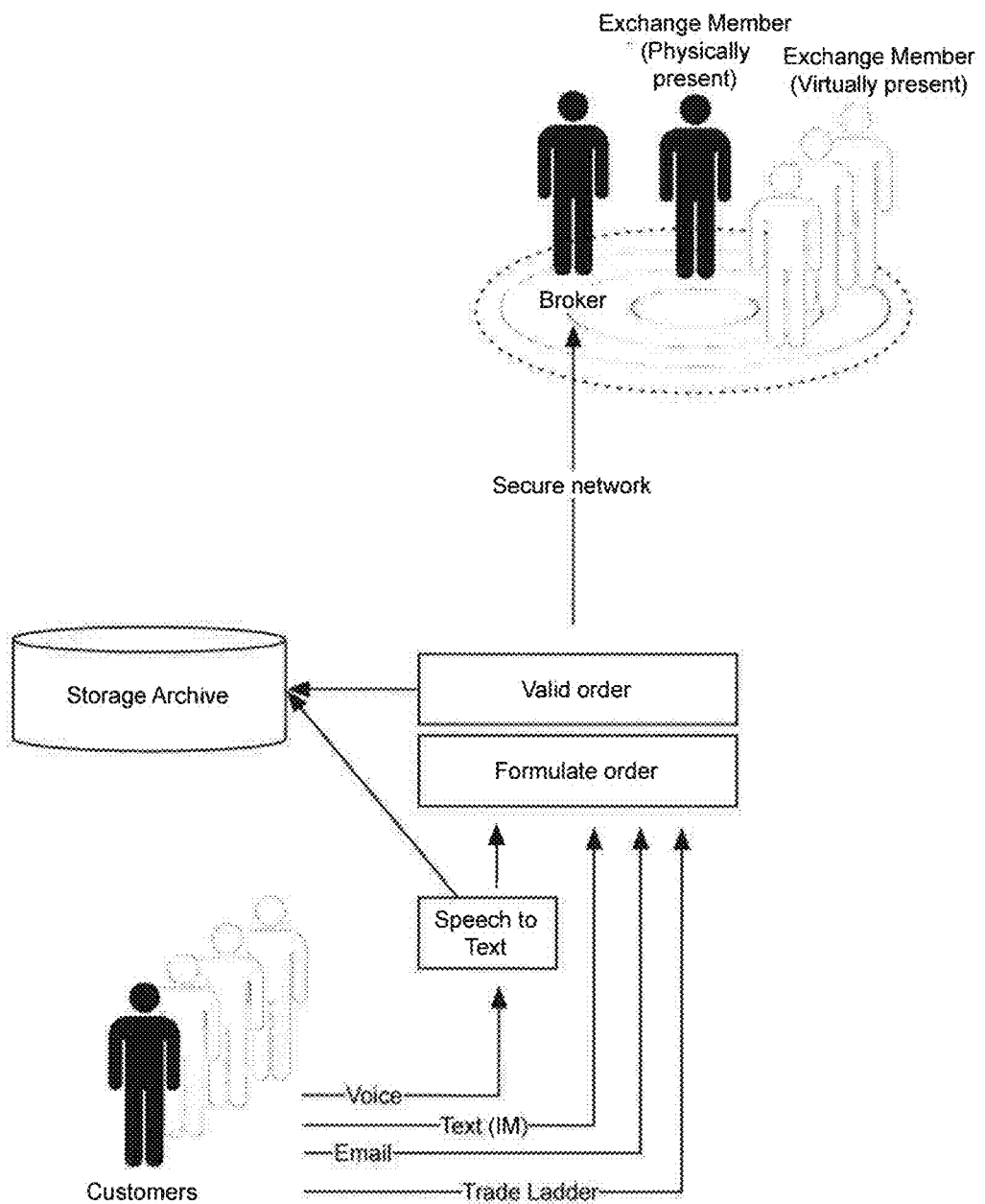
FIG. 2 is a process diagram showing how orders are received from customers and transmitted to the broker.

As shown in FIG. 1, customers may access the system via voice (any type of phone call or voice over IP is sufficient), text message (IM), or e-mail. Voice inputs are automatically converted to text using a speech-to-text module. All orders are then processed by the system to determine what type of order they are and to format them for communication to the broker to be executed. Both the raw input data—voice, text, e-mail, trade ladder (e.g. customer entered via web page or similar)—and the formatted order information are stored in the data archive. Once a valid order is identified, it is transmitted via a secure network to the broker and places the order on the broker's order sheet. This is private data that only the broker can view. If there is a phone clerk, the clerk is also notified of any incoming orders. Either the clerk or broker can communicate back to the customer using the same forms; voice, text, or e-mail.

A variant of the present invention includes a system for customers to bid into markets against other customers directly, without a broker. The "over the counter" marketplace allows customers (retaining their anonymity) to place bids and offers via a separate interface version that does not reveal the identity of the counterparties (see next section). The interface allows the customer to trade from outside the exchange floor (the physical security component may or may not be used here). Multi-factor identification is used to verify the identity of the customer. The customer is provided with the same market information that any exchange member would receive, but they may place orders directly without using a broker.

The Exchange Member Interface

Figure 3:
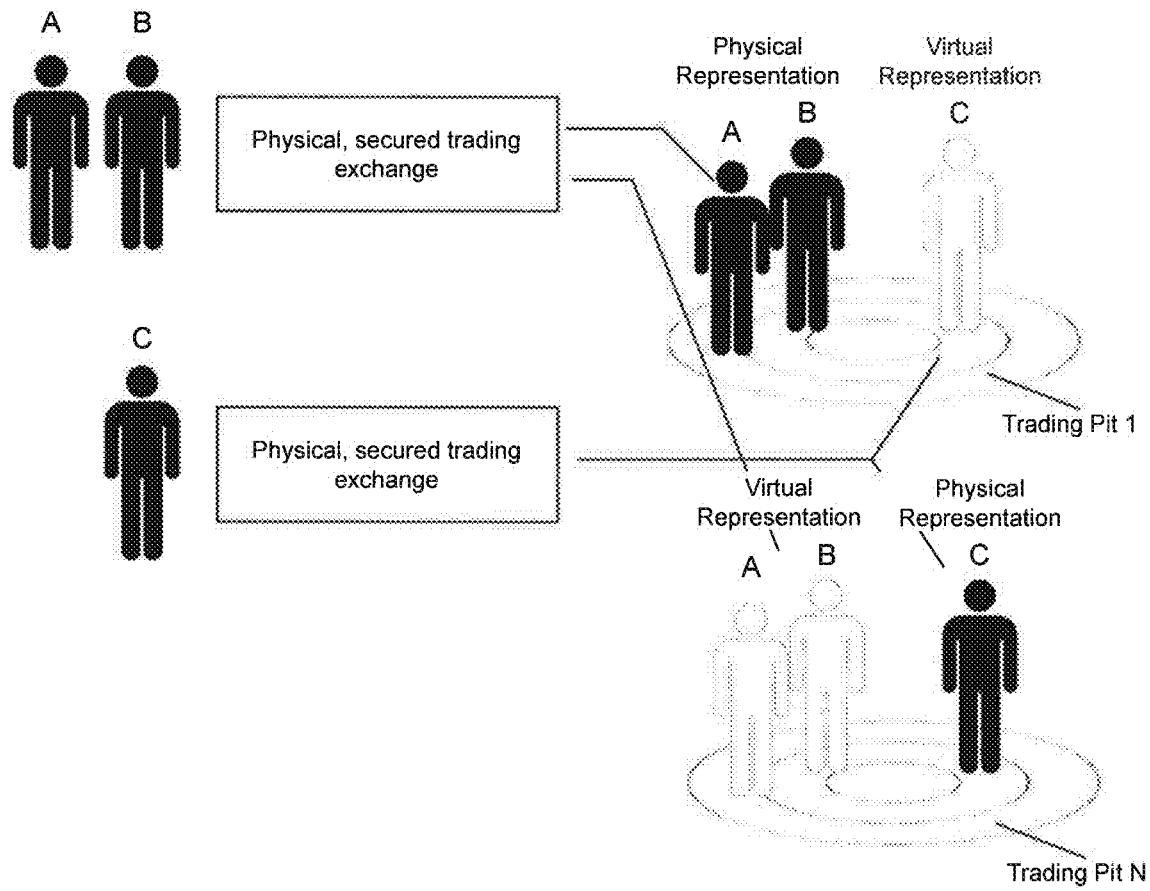
FIG. 3 illustrates how exchange members who are not co-located can transact across multiple physical trading pits.

When the exchange member is in the secure exchange facility, he must use (see FIG. 3) a personal display device equipped with audio output (any form of earphone is satisfactory), audio input (a directional microphone, boom microphone, or similar), and optional manual input device (buttons on an input device, a mobile computing device such as a cellphone or tablet, or any other method of input where the user uses fingers or gestures).

On the personal display, the exchange member can view all private information such as the order sheet and the execution sheet. It is critical that the personal display be configured such that only the exchange member can view it—e.g. no eavesdropping or accidental exposure to third parties. A see-through eye-worn device, a wearable display (e.g. on the wrist or forearm), or similar are all sufficient display formats. A head-mounted (or eye-worn) device may include a head tracking device to determine the direction of gaze. This allows the exchange member to move about the virtual data representations of the pits and contract columns (see FIG. 6).

Figure 4:
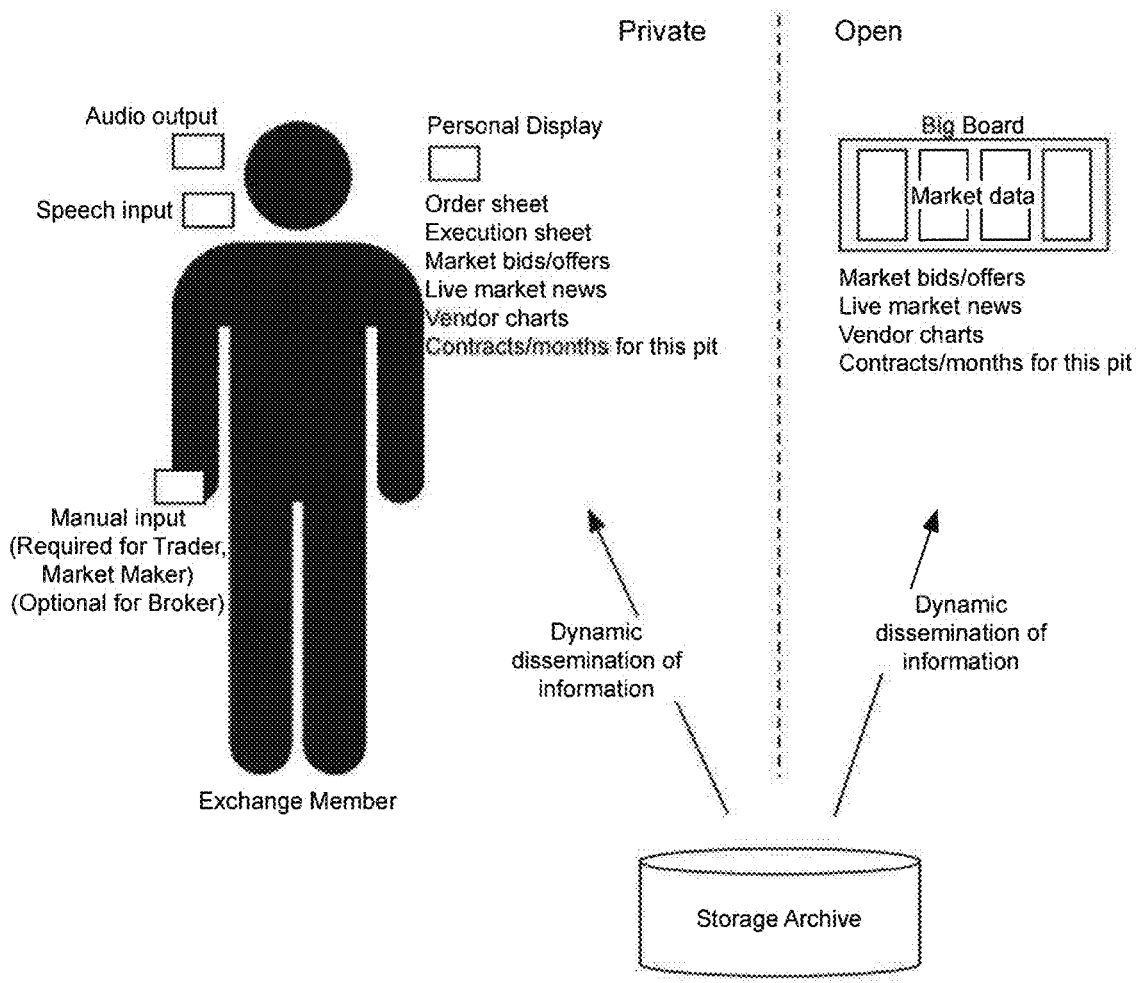
FIG. 4 shows the physical components of the system available to the exchange member for input and output of information.

The personal display can include public information as well as private (FIG. 4). This might include market bids and offers, live market news, vendor charts, and the contracts and months that are available in the current trading pit. This information can also be made available on the "big board" (similar in form to display boards on current exchange floors) such that all exchange members physically present at that facility can view it at the same time. All data on personal and open displays is dynamically updated from the system database as trades are reported and confirmed.

Figure 6:
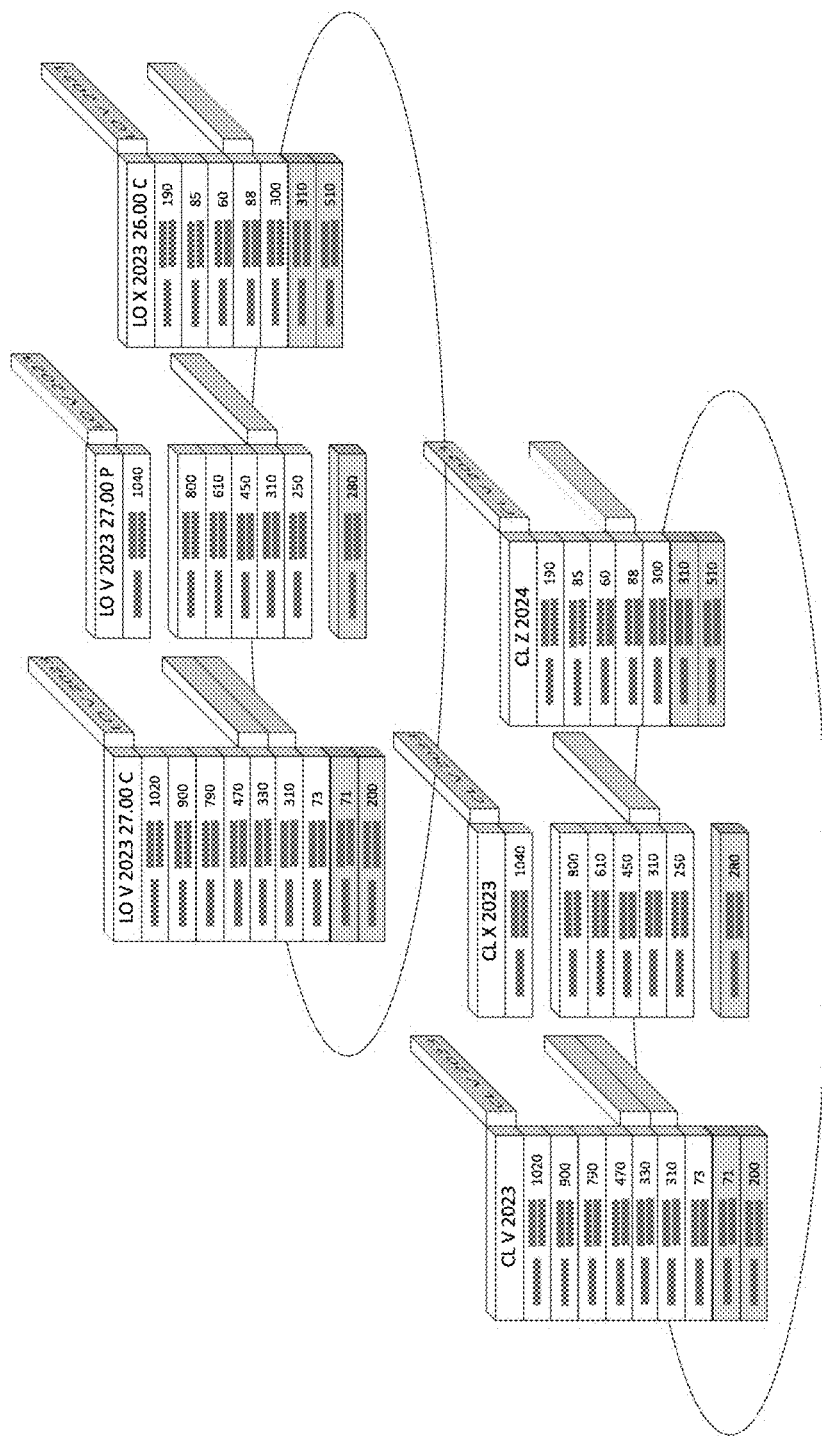
FIG. 6 is a depiction of one embodiment of the personal display interface.

The first step for the exchange member is to select which trading pit to enter. FIG. 6 shows one embodiment of the personal display interface. In it, multiple pits can be seen; in the foreground and in the background. The exchange member selects one pit. Note that the exchange member need not be in a pit to trade, but he must be logged onto the exchange floor. Also, a member may pick contracts from various pits to either execute a spread or an arbitrage.

On entering the pit, the exchange member first views all the contract months trading or a select group. The exchange member selects contract months to bid/offer. By way of example, FIG. 6 depicts each contract month as a separate column. Others visual and aural depictions are possible. The exchange member verbally announces bids and offers (see FIG. 5). As he/she speaks, the voice is recoded and the speech is converted into text for storage and further processing. The verbal bid or offer is converted into a text format recognized by the system. Other exchange members hear the verbal outcry and may respond in kind, verbally, or can select the bid or offer in the appropriate column to confirm the trade. The system tracks and archives all negotiation data and the digital variants after conversion to text. All data is stored preserving the time at which it occurred.

Figure 5:
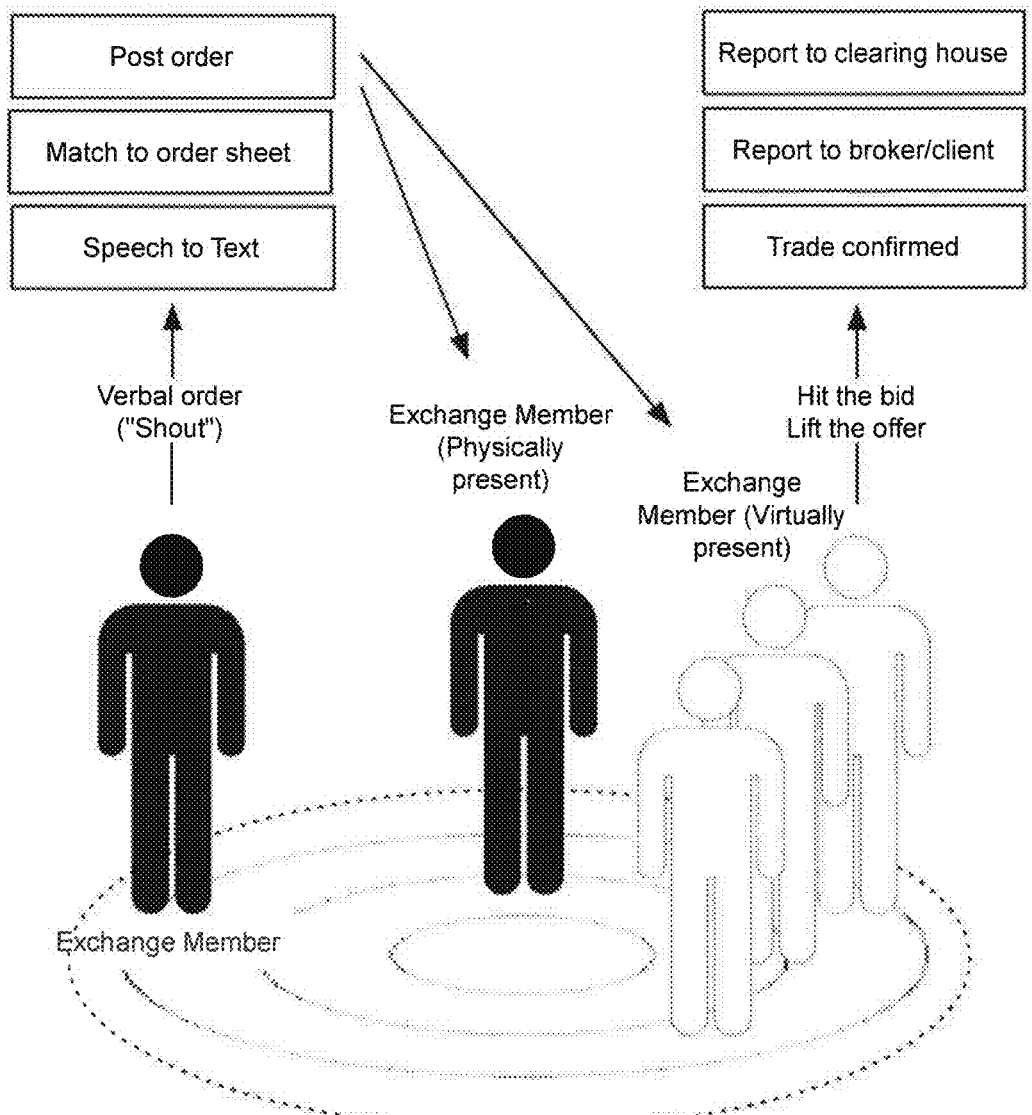
FIG. 5 is an expanded view of the trade process.

As shown in FIG. 5, the exchange member shouts his order which is converted into text so that it can be posted to the appropriate column. The system also matches the shout to that exchange member's order sheet and determines if this is a new or existing bid/offer. The bid/offer is posted for others to see/hear. Other exchange members, either physically present or located at other approved exchange facilities, may respond to the bid or offer either by voice or manually by touch. When one lifts the offer or hits the bid the trade is confirmed with feedback to both exchange members. That trade is now reported to the customer as executed and is also reported to the marketplace globally and to the clearing house as required by the exchange. The trade is reported to the big board and to data vendors for global publication to subscribers. The trade is also placed on the execution sheets of both exchange members.

In addition to support in the actual execution of trades, the system also supports the exchange member in managing all trading activities, executing a trading strategy, and otherwise maximizing profit for customers. This support includes alerts, reminders, and signals to help the exchange member attend to multiple competing attention demands. There are also private logs and other assistants for the exchange member to optimize performance. The trading ladder includes information such as:

A table of detailed open or closed positions with execution time stamps, price and size and counterparty member identity Market information and price display for quick review of profitability of open positions against a market conditions Dynamic account information from clearing house Compliance Problems Resolved The critical issues addressed by the current invention deal with compliance and security problems. Some of these problems are inherent with order matching and latency arbitrage, while others existed prior to electronic trading. The present invention resolves all of these.

Bucketing: A customer calls in an order with the broker who "confirms" the trade back to the customer without actually executing it. If the price rises during the delay, the broker passes that cost to the customer. But if the price decreases, the customer pays the higher price and the broker keeps the difference.

The present invention resolves this by disallowing confirmation back to the customer until the order is executed. The broker no longer has a role in confirmation.

Churning: A customer's objectives can often be met by any number of trades. A broker paid on commission by trade may purposely increase the trading frequency on a customer's account in order to raise commissions.

The present invention can alert the compliance department and/or clearing firm of the customer if certain trading thresholds are exceeded.

Front running: As described earlier, a broker can trade ahead of his customer's order. If the broker holds a customer's big order waiting for the price to raise slightly, he can sell into his customer's position at a profit to himself. Knowing that orders exist before they are executed allows this.

The present invention resolves this problem in two ways. First, it ensures that all exchange members receive information at the same time and in the same form. Second, the system can detect that the broker executed the same trade while an order for a customer waited in the queue.

Flash trading: Using algorithms and high speed networks, exchange members obtain access to existing market orders fractions of a second before they are executed allowing for fast front running.

Similar to the solution for front running, in the present invention, there is no way to view orders before they are executed since they are not available at all until they are executed.

High Frequency Trading: As mentioned previously, using algorithms and fast processors, HFT is able to analyze market conditions and trade at high volume and high speed. Faster trades tend to have higher profits. This technique uses order matching that requires the posting of orders before execution that raises many of the issues listed here.

The present invention disallows HFT because only a human exchange member can execute a trade.

Circular trading or Wash sales: A form of fraud where a broker places buy orders of the same volume and on the same contract as offsetting sell orders he knows will be entered at that time.

The present invention alerts the compliance department if it finds trading patterns that fit a known method of fraud.

Cross trades: An illegal practice where a buyer and seller agree to a trade that is not reported via the exchange. Also when a broker buys and sells within a contract from one customer to another where both customers are managed by the same portfolio manager or broker.

The present invention disallows this practice because the only way a trade can occur is by bringing the bid to the market.

Interpositioning: An illegal practice where a broker adds another broker or dealer into a trade although that broker provides no benefit to the customer. This is done as a hidden benefit for the broker and is deceptive conduct that defrauds the customer.

The present invention forces brokers to designate backup brokers a priori. There are times that a broker will wish to mask the size of an order by splitting it across multiple brokers, which is a valid practice.

Trading ahead: Similar to front running, when an exchange member who has securities to trade does so ahead of his customer's orders, thus penalizing the customer to his advantage.

The present invention tracks all orders executed and will note that an exchange member has traded his own securities ahead of customers. This is reported to compliance.

Cornering a market: When an exchange member acquires enough shares of a particular security or commodity futures contracts position to manipulate its price.

The present invention dynamically tracks all market activity. Any attempt to manipulate price and market share will be immediately apparent.

Pre-arranged trading: When buyers and sellers agree to the terms of a trade and price outside of the operation of the exchange. This practice can give rise to all manner of side deals that violate the rules of the exchange and thus damage the integrity of the market.

The present invention disallows pre-arranged trades because no order can be executed unless brought to the market.

The Exchange

The exchange includes several models of participation and profit aggregation. Membership into the exchange can have an associated fee called "membership fees". Transactions executed within the exchange can have associated fees called "transaction fees". The aggregated data from the exchange can also be sold to data venders and other third party analysts for publication.

Educational Applications

The present invention further pertains to the operation and management of any type of educational platform to educate students (at schools, universities, or training programs) on the topic of open outcry methodology and the concept of negotiation. The electronic open outcry platform can be used as a teaching laboratory for all students who wish to learn about the market place.

INDUSTRIAL APPLICATION

The present invention pertains to the operation and management of any type of exchange, e.g. commodities contracts, futures, stocks, or any security.

What is claimed is:

1. A system for secure and compliant securities trading on an exchange using an open outcry method, the system comprising:
   a trade event having an order type, a customer order, and trade information including a time code indicating when the trade event occurred;
   a storage database for securely storing trade events;
   a customer interface coupled to the storage database, said customer interface having a processor and computer readable storage medium containing software instructions to
      receive a customer order from a customer via voice or text, said customer order having an order type, order information, and optional contingencies,
      convert the customer order into a standard format,
      validate the customer order to verify that the customer order is complete and valid, and
      store the formatted and validated customer order in the storage database and onto an order sheet associated with an exchange member for the customer;
   an exchange member interface coupled to the storage database having
      a personal display having an eye-worn device and a head-tracker, viewable only to the exchange member that cannot be viewed by other exchange members;
      a public display that is not private to any specific exchange member and is viewable by all exchange members;
      audio inputs and outputs for making and receiving bids based on the customer order; and
      a processor and computer readable storage medium containing software instructions to
         select a trading pit and associated contract months in which the exchange member will trade, present the order sheet on the personal display;
present public data associated with the trading pit on the public display,
receive a verbal customer order from the exchange member as an outgoing bid,
convert the outgoing bid into a standard text format,
match the outgoing bid against the order sheet to determine if the outgoing bid is a new outgoing bid on a new customer order or an existing outgoing bid on an existing customer order,
post the outgoing bid in the public display for other exchange members to see and hear,
accept an incoming bid resulting in a completed trade event,
store the completed trade event to the storage database, and
report the completed trade event to the public display, to the customer, and to a clearing house; and a compliance checker and reporter having a processor and computer readable storage medium containing software instructions to
analyze completed trade events in the storage database,
identify and report instances of bucketing, churning, front running, flash trading, high frequency trading, circular trading, cross trading, interpositioning, trading ahead, cornering the market, and pre-arranged trading, and
confirm compliance of completed trade events to the exchange when the compliance checker and reporter verifies compliance of said completed trade event.

2. The system of claim 1 further including a manual input device for gesturing, pointing, and selecting virtual items within the personal display.

3. The system of claim 1 further including a physical security facility coupled to the storage database, said physical security facility comprising:

a multi-factor authentication device,
a redundant high-speed network connection,
a data communication recorder, and
a proximity control that limits access to protected information of the exchange to authenticated exchange members within the physical security facility.

4. The system of claim 1 wherein the processor of the exchange member interface if further configured to receive a textual customer order from the exchange member as an outgoing bid.

5. The system of claim 1 wherein the personal display and the public display are merged into one display for the exchange member, without leaking data from the personal display to data sources for the trading pit viewable by other exchange members.

6. The system of claim 1 wherein the exchange member interface and the customer interface are merged into one interface for the customer, thereby allowing the customer to place orders without the use of the exchange member.

7. The system of claim 1 where the personal display is a wearable display worn on the wrist or forearm.

8. The system of claim 1 where the public display includes live market news, vendor charts, and contracts and months that are available in the current trading pit.

9. The system of claim 1 further including alerts, trade strategy assistance, reminders, and signals for the exchange member.

10. The system of claim 3 where exchange members are physically present in the physical security facility.

11. The system of claim 3 where exchange members who are not physically present in the physical security facility are presented as a virtual representation in the trading pit.

* * * * *